May 28, 1963  F. AKUTOWICZ  3,091,210

MARINE PROPULSION FIN

Filed Sept. 22, 1961

INVENTOR.
FRANK AKUTOWICZ
BY

3,091,210
MARINE PROPULSION FIN
Frank Akutowicz, 2007 Harvey Road,
Wilmington 3, Del.
Filed Sept. 22, 1961, Ser. No. 140,100
2 Claims. (Cl. 115—28)

This invention is for a marine propulsion apparatus which works like the fins of a swimming fish. Thrust is obtained by wave motion moving backward through the fin-like apparatus at a speed somewhat greater than the forward speed of the hull. The wave motion is obtained by enclosing a helical shaft in a transversely stiff longitudinally flexible envelope. The two reinforced rubber skins of the envelope make contact with the shaft through the transverse metal stiffeners bonded to the skins. The skins are joined together along their fore and aft edges so that the enclosed shaft is not exposed to the elements. The envelope assumes in longitudinal cross-section the sinusoidal shape of the helical shaft in plan view. As the shaft rotates the individual sinuosities move aft and accelerate the water entrained in them. The wave motion is substantially rectilinear in the aft direction so that vortex creation is less than in a conventional screw. Furthermore the pitch of the helix can be increased gradually in the aft direction so that water is steadily accelerated under the influence of the apparatus. This feature minimizes eddying and loss of efficiency.

Figure 1:
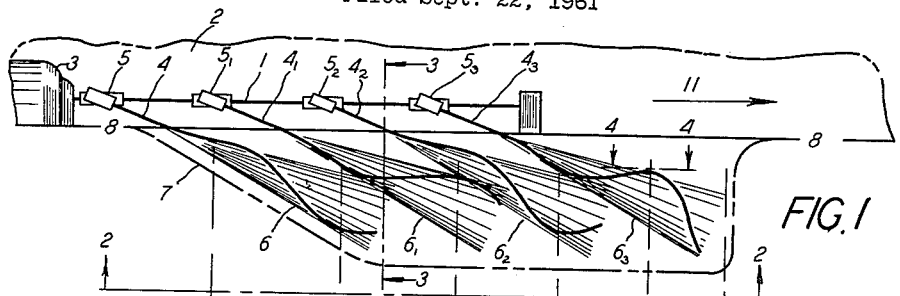
Figure 2:
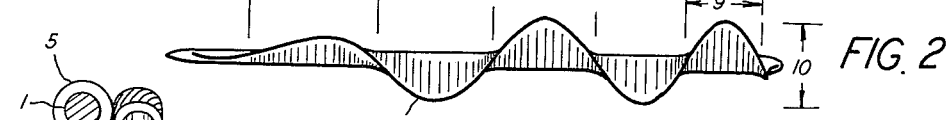
Figures 3, 4, 5:
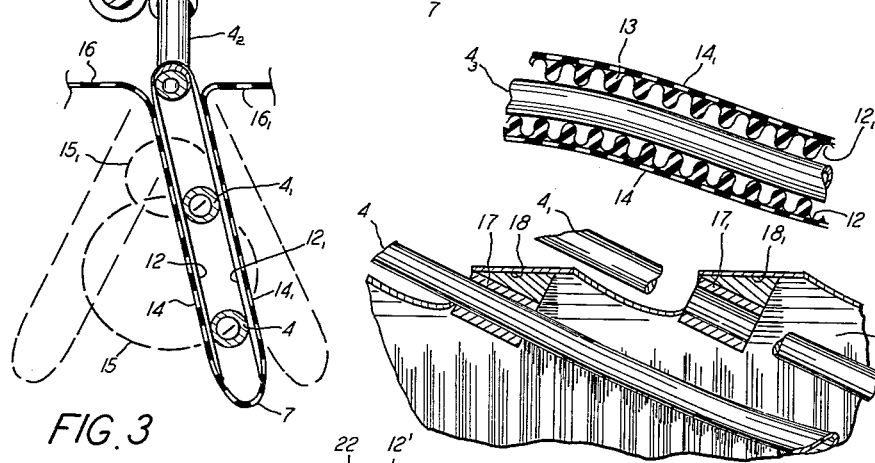
Figure 6:
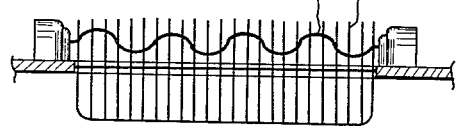
Figure 7:
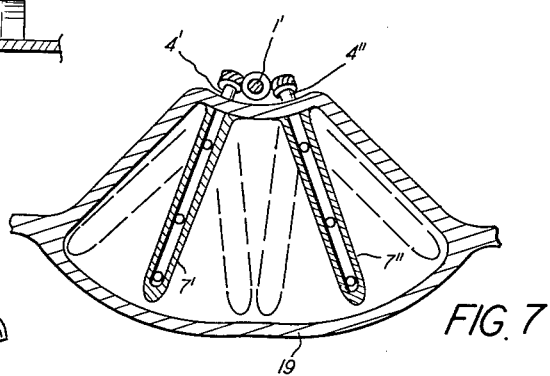
Figure 8:
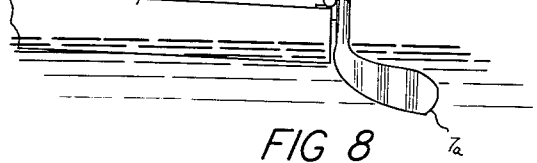

FIGURE 1 shows the preferred embodiment of the invention, which includes a plurality of drive shafts. FIGURE 1 is in diagrammatic form to show the basic relationships uncluttered with details. FIGURE 2 is view 2—2 of FIGURE 1. FIGURES 3 and 4 are sections 3—3 and 4—4 respectively of FIGURE 1. FIGURE 5 is a detail of the drive shafts supports and envelope swiveling means. FIGURE 6 shows diagrammatically a second embodiment in which a single drive shaft is located inboard the hull. FIGURE 7 shows in transverse cross section a further embodiment in which two fins are driven from a common drive shaft. This embodiment also includes a shroud 19 for the apparatus, useful in shallow draft vessels. FIGURE 8 shows a further embodiment of the apparatus driven by an outboard motor mounted on a skiff.

In FIGURE 1 envelope 7 is attached along its entire length (line 8—8) to hull 2. The envelope thus swivels about this line of attachment between limits shown in FIGURE 3 in dotted lines. Cones 6, $6_1$, $6_2$, $6_3$ are inscribed within the dihedral angle formed by these limits with vertex along line 8—8. Line 8—8 is the fore and aft axis of oscillation of envelope 7. The vertices of cones 6, $6_1$, $6_2$, $6_3$ lie on line 8—8. The centerlines 4, $4_1$, $4_2$, $4_3$ of the helical drive shafts are wrapped around the cones 6, $6_1$ . . . . The shafts 4, $4_1$ . . . are rigidly mounted on hull 2 by means of trunnions 17, $17_1$ . . . and are rotated through gear sets 5, $5_1$, $5_2$, $5_3$ by shaft 1. Shaft 1 is driven through gear box 3 by a conventional turbine, not shown. As shafts 4, $4_1$ . . . rotate, their outboard ends sweep out the conical trajectories 6, $6_1$ . . . . Corrugated stiffeners 12, $12_1$, however, swivel about the line 8—8 and make sliding contact with shafts 4, $4_1$ . . . as shown in FIGURE 3. The shafts are so arranged that at any transverse station (e.g. section 3—3) all shafts passing through the station are substantially in the same phase. Since shafts 4, $4_1$ . . . are driven at synchronous speed by common drive shaft 1, they remain permanently in phase, and nodes of overlapping helices of adjacent shafts do not foul each other. FIGURE 3 shows the overlapping trajectories 15, $15_1$ of drive shafts $4_1$, $4_2$ at section 3—3. Shafts 4, $4_1$ . . . are made as rigid and numerous as possible. The gross deformation of envelope 7 visible in FIGURE 2 does not correspond to large deformations of shafts 4, $4_1$ . . . but merely to the envelope following the rotating conical helices. Lines of constant phase are substantially perpendicular to the direction of motion of the hull, and these lines coincide with the direction of the corrugations of reinforcement 12, $12_1$. This produces the desired rectilinear procession of phases in the aft direction.

FIGURE 2 shows that the wave length 9 of the envelope deformation increases in the aft direction. This corresponds to increasing the pitch of the helical shafts in the aft direction. Arrow 11 indicates the forward direction in FIGURES 1 and 2. The amplitude 10 at a constant elevation in envelope 7 remains constant throughout the length of the fin. These relationships involving the wave length and amplitude are preferred features of this invention, the former to obtain greater thrust from an increasingly turbulent fluid field downstream, and the latter because fore and aft changes in amplitude diminish the efficiency of swimming.

Shafts 4, $4_1$ . . . carry the entire lateral bending moment of envelope 7 about line 8—8. Normally this moment is zero since there is practically no net side thrust on envelope 7 as long as the fin remains well covered with water. The downward inclination of shafts 4, $4_1$ . . . causes a slight unsymmetry in the longitudinal horizontal profile of envelope 7, and a corresponding slight side thrust. Shaft inclination of the order of 20° below the horizontal do not cause excessive loss of symmetry. The forward inclination of the shafts shown in FIGURE 1 is preferred so as to introduce the largest fin area to undisturbed water.

FIGURE 4 shows the transverse stiffeners 12, $12_1$ bearing against shaft $4_3$. The exterior hollows of the stiffeners are filled with soft rubber 13 covered by rubber skins 14, $14_1$. Skins 14, $14_1$ are re-inforced with tire cord. In FIGURE 3 fairing skins 16, $16_1$ are shown as extensions of skins 14, $14_1$.

In FIGURE 5 trunnions 17, $17_1$ support helical shafts 4, $4_1$ . . . while bearing surfaces 18, $18_1$ support envelope 7. The thrust of the fin is carried partly by skins 16, $16_1$, and partly by shafts 4, $4_1$ . . . . Additional thrust bearings could also be included in surfaces 18, $18_1$.

FIGURE 6 shows an embodiment achieved by extending the stiffening armor 12' to engage helical drive shaft 22 shown diagrammatically. This embodiment exposes a somewhat larger fin area to the water.

In FIGURE 7 two helical shafts 4', 4" are driven from common drive shaft 1'. Hydrodynamically it would be more efficient to rotate shafts 4', 4" in opposite directions, but the embodiment shown is simpler to achieve. Shroud 19 provides a converging raceway aft for the fins 7', 7" to accelerate water. Shrouding the fin does not necessarily improve propulsive efficiency because an unshrouded fin induces a larger mass of water into accelerated motion. This accords with the well known principle of naval architecture that the propulsive efficiency is high when a large mass of water is given a small acceleration.

In FIGURE 8 envelope 7a is driven by motor 20 mounted on skiff 21.

I claim:

1. In a marine propulsion fin of the traveling wave type, including within its envelope a fore and aft axis of oscillation together with a rotatable helical shaft, the novel combination characterized by inclination of the helical shaft with respect to the axis of oscillation, the centerline of the shaft having the form of a helix wrapped on a cone, the vertex of said cone lying on the axis of oscillation.

2. The propulsion fin of claim 1 including a plurality of helical shafts having increasing pitch in the aft direction.

References Cited in the file of this patent

UNITED STATES PATENTS

| | | |
|---|---|---|
| 10,091 | Ware | Oct. 4, 1853 |
| 144,538 | Harsen | Nov. 11, 1873 |

FOREIGN PATENTS

| | | |
|---|---|---|
| 273,226 | Great Britain | June 30, 1927 |